US010755098B2

(12) United States Patent
Sun et al.

(10) Patent No.: US 10,755,098 B2
(45) Date of Patent: Aug. 25, 2020

(54) EVALUATION METHOD OF SOLAR ENERGY UTILIZATION POTENTIAL IN URBAN HIGH-DENSITY AREAS BASED ON LOW-ALTITUDE PHOTOGRAMMETRY

(71) Applicant: HARBIN INSTITUTE OF TECHNOLOGY, Harbin (CN)

(72) Inventors: Cheng Sun, Harbin (CN); Yunsong Han, Harbin (CN); Yongjie Pan, Harbin (CN); Qi Dong, Harbin (CN); Dagang Qu, Harbin (CN); Yongheng Jia, Harbin (CN); Lei Liu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 105 days.

(21) Appl. No.: 16/205,464

(22) Filed: Nov. 30, 2018

(65) Prior Publication Data
US 2019/0197311 A1    Jun. 27, 2019

(30) Foreign Application Priority Data
Dec. 26, 2017  (CN) .......................... 2017 1 1431061

(51) Int. Cl.
| | |
|---|---|
| *G01C 11/00* | (2006.01) |
| *G06T 7/194* | (2017.01) |
| *G06F 30/20* | (2020.01) |
| *H02S 20/23* | (2014.01) |
| *H02S 20/24* | (2014.01) |
| *G06K 9/00* | (2006.01) |
| *G01C 11/02* | (2006.01) |
| *G06T 7/187* | (2017.01) |
| *G06K 9/46* | (2006.01) |
| *G06K 9/62* | (2006.01) |

(Continued)

(52) U.S. Cl.
CPC .......... *G06K 9/00637* (2013.01); *G01C 11/02* (2013.01); *G01C 11/04* (2013.01);
(Continued)

(58) Field of Classification Search
USPC ............... 352/57–69, 85–95, 132, 166–179; 382/113–228, 254–312
See application file for complete search history.

(56) References Cited

U.S. PATENT DOCUMENTS

| | | | |
|---|---|---|---|
| 2014/0200861 A1* | 7/2014 | DeVito | ............... G06F 30/13 703/1 |
| 2017/0076304 A1* | 3/2017 | Toth | ............... G06Q 30/0202 |
| 2019/0156520 A1* | 5/2019 | Mammou | ............... G06T 9/001 |

FOREIGN PATENT DOCUMENTS

| | | |
|---|---|---|
| CN | 103942420 A | 7/2014 |
| WO | 20140110288 A1 | 7/2014 |

OTHER PUBLICATIONS

Xianfeng Zhang et al., Journal of basic science and engineering, vol. 22, No. 3, Jun. 2014, p. 415-425.
(Continued)

*Primary Examiner* — Marcellus J Augustin
(74) *Attorney, Agent, or Firm* — IPro, PLLC; Na Xu; Qian Gu

(57) ABSTRACT

The present invention proposes an evaluation method of solar energy utilization potential in urban high-density areas based on low-altitude photogrammetry, comprising the following steps: low-altitude data acquisition using drones, acquisition of three-dimensional point cloud data, screening of building subject points, selection of seed region, region growth and point cloud patch segmentation, three-dimensional reconstruction, building geometry model, solar radiation simulation and solar energy utilization potential assessment steps. The invention utilizes low-altitude photogrammetry to obtain point cloud data in a high-density area of the city, and performs semantic division and three-dimensional reconstruction on the point cloud data through a parameterization tool to obtain a singular geometric model. Therefore, the solar radiation and dynamic change obtained from the roof and facade of the building are simulated and analyzed in the same platform.

3 Claims, 1 Drawing Sheet

(51) Int. Cl.
  *G01C 11/04* (2006.01)
  *G06F 30/13* (2020.01)
  *H02S 20/22* (2014.01)

(52) U.S. Cl.
  CPC ........... *G06F 30/13* (2020.01); *G06K 9/4652* (2013.01); *G06K 9/6247* (2013.01); *G06T 7/187* (2017.01); *G06T 2207/10028* (2013.01); *G06T 2207/10032* (2013.01); *G06T 2207/30184* (2013.01); *H02S 20/22* (2014.12)

(56) References Cited

OTHER PUBLICATIONS

Yang Lv et al., "3D modeling of tree crowns and its application in solar energy potential mapping for urban neighborhoods", 2014 IEEE Geoscience and Remote Sensing Symposium, p. 4808-4811.

G. Peronatoa et. al., 3D-Modeling of Vegetation From LiDAR Point Clouds and Assessment of Its Impact on FAC, ADE Solar Irradiation,The International Archives of the Photogrammetry, Remote Sensing and Spatial Information Sciences, vol. XLII-2/W2, 2016 11th 3D Geoinfo Conference, Oct. 20-21, 2016, p. 67-70.

Ahmad Kamal Aijazi,et. al., Segmentation Based Classification of 3D Urban Point Clouds: A Super-Voxel Based Approach with Evaluation, Remote Sens. 2013, 5, 1624-1650.

Mahmoud Ouria et. al., Evaluation of the potential of solar energy utilization in Famagusta, Cyprus, Sustainable Cities and Society 37 (2018) 189-202.

Marko Bizjak et. al., Evolutionary-driven search for solar building models using LiDAR data,Energy and Buildings 92 (2015) 195-203.

Minglei Li,et. al., Reconstructing building mass models from UAV images, Computers &Graphics54(2016)84-93.

\* cited by examiner

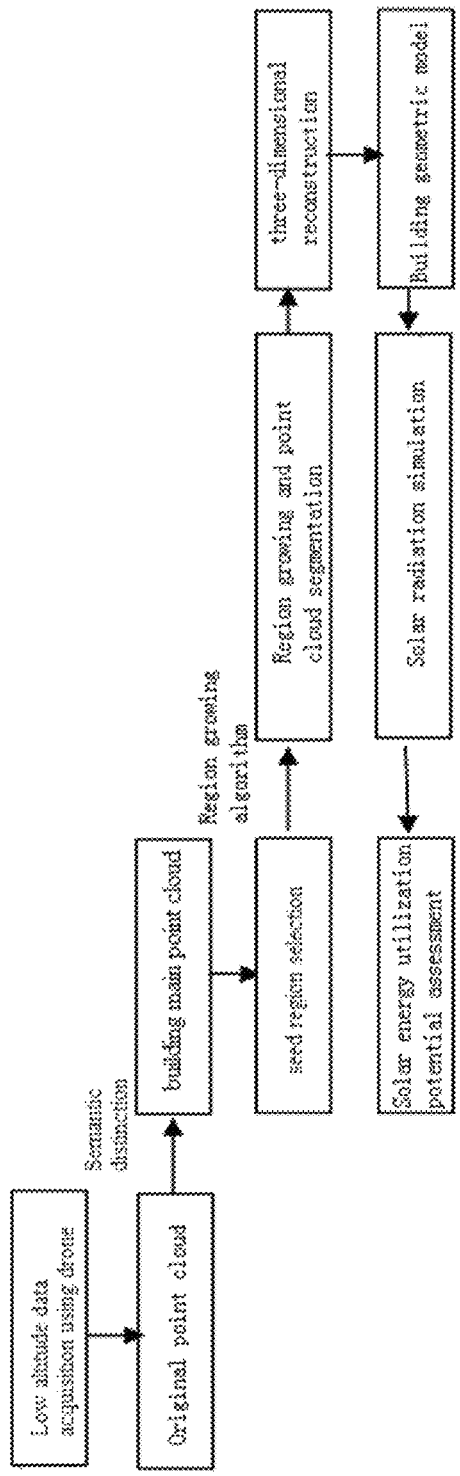

EVALUATION METHOD OF SOLAR ENERGY UTILIZATION POTENTIAL IN URBAN HIGH-DENSITY AREAS BASED ON LOW-ALTITUDE PHOTOGRAMMETRY

CROSS-REFERENCES AND RELATED APPLICATIONS

This application claims priority of Chinese Application No. 201711431061.3, entitled "An Evaluation Method of Solar Energy Utilization Potential in Urban High-density Areas Based on Low-altitude Photogrammetry", filed Dec. 26, 2017, which is herein incorporated by reference in its entirety.

FIELD OF THE INVENTION

The invention relates to the technical field of solar energy utilization potential assessment, in particular to a method for evaluating the Solar Energy Utilization Potential in Urban High-density Areas Based on Low-altitude Photogrammetry.

BACKGROUND OF THE INVENTION

With the increasingly serious energy crisis and the rapid development of urbanization, the integrated design of photovoltaic and building will become an important trend of urban solar energy development. In urban high-density areas, buildings with different heights are densely distributed, which make the distribution of solar radiation on the surface of the building unevenly. Especially, the mutual shielding between buildings has a great impact on the utilization of solar energy. Calculating the available solar radiation on different building surfaces and evaluating the potential of solar energy utilization plays an important role in guiding the installation of distributed photovoltaic energy in urban high-density areas, improving urban energy efficiency and optimizing energy structure.

The traditional evaluation method of solar energy utilization potential mainly relies on human subjective judgment. However, the solar radiation distribution depends on time, climate and the relative spatial position of buildings in the survey area. For the complex and variable survey environment of urban high-density areas, simple investigations and subjective calculations are difficult to cope with. For the traditional manual measurement method, the analysis efficiency is low, and the data acquisition and post-processing are separated, which is difficult to meet the demand.

At present, the evaluation of solar energy utilization potential mainly focuses on airborne LiDAR (Light Detection and Ranging, LiDAR) point cloud data, and most of them are in the research stage. The processing flow is mainly to generate the digital surface model (DSM) from the original point cloud data, and then calculate shadow directly on the DSM grid. However, DSM has obvious characteristics of 2.5 D, which cannot depict the building facade well and cannot complete the calculation of solar radiation illumination of the facade. For the complex environment of high-density urban areas, geometric modeling of the collected data is still needed to ensure the quality and integrity of solar energy utilization potential analysis. At the same time, the LiDAR point cloud data processing process is complex, and the amount of manual interaction is large. The cost of obtaining large area point cloud data is high and difficult to popularize.

SUMMARY OF THE INVENTION

In order to solve the existing technical problems, the present invention proposes an evaluation method of solar energy utilization potential in urban high-density areas based on low-altitude photogrammetry.

The object of the present invention is achieved through the following technical solutions: an evaluation method of solar energy utilization potential in urban high-density areas based on low-altitude photogrammetry, comprising the following steps:

Step 1, the low-altitude remote sensing image data of urban high-density area are obtained, and the three-dimensional point cloud data are generated through image processing;

Step 2, based on the information carried by the three-dimensional point cloud data, the point cloud of building subject is distinguished from that of the non-building subject, and the filtered singular three-dimensional point cloud data are obtained;

Step 3, through the point cloud patch segmentation method based on curvature and normal vector, and the subsequent column model reconstruction, the singular 3D point cloud data is reconstructed in three dimensions to obtain a singular urban high-density area building geometry model.

Step 4, through the computer simulation of the singular geometric model of buildings in the urban high-density area, the distribution information of solar radiation on the surface of buildings is obtained. Data analysis is performed on the distribution information of the solar radiation on the surface of the building, and the potential of solar energy utilization in the urban high-density area is evaluated through the results of data analysis.

Further, the low-altitude remote sensing image data are high-resolution image data obtained by the consumption-grade multi-rotor drone and the tilt photography method of the single camera.

Further, the step 2 is specified as follows: in the parametric modeling tool, the color parameters in the point cloud model are extracted by Volvox plug-in, and the desired points and the points to be filtered are selected by setting the RGB range.

Further, in the parametric modeling tool, the color parameters in the point cloud model are extracted by Volvox plug-in, the points needed and the points non-needed are selected by setting RGB range, specifically includes:

(1) The point cloud model P is decomposed into set $P_{XYZ}$ containing only coordinate information and set $P_{RGB}$ containing only color information;

(2) $P_{RGB}$ is decomposed into three independent collections $P_R$, $P_G$, $P_B$, which represent values of R, G, and B;

(3) Setting respective thresholds of $P_R$, $P_G$, and $P_B$ according to the color distribution of the three-dimensional point cloud data and the color of the object to be specifically selected;

(4) According to the intersection $P_{R \cap G \cap B}$ of $P_R$, $P_G$ and $P_B$, the required point set $P_s$ is filtered from the point cloud model P.

Further, the step 3 specifically includes: Neighborhood points are searched by KNN nearest neighbor algorithm, and the covariance matrix is constructed for neighborhood points. Normal vector and curvature are estimated by PCA principal component analysis algorithm to construct the seed region. Then the region growth algorithm is used to extract the point cloud patches on each side of the building. The mapping relationship between the roof patch $P_0$ and the ground plane grid is constructed, and the average height of the point cloud is taken as the grid height to obtain the columnar model of the building, and the plane fitting of the column model is carried out to obtain the singular geometric model of the building in the urban high-density area.

Compared with the prior art, the invention has the following advantages:

1. The invention fully utilizes the characteristics of low-altitude photogrammetry technology to acquire three-dimensional information in the survey area quickly, efficiently, and provides a method of low-cost, low-altitude urban high-density area data acquisition by combining consumer-grade drone and photogrammetry software. Compared with the traditional manual measurement, the invention adopts the UAV photogrammetry technology, avoids the high time-consuming and low efficiency of the manual operation, and effectively promotes the automation and standardization of the data collection. Compared with LiDAR technology, the invention adopts consumption-grade multi-rotor drone, greatly reduces the cost of data acquisition and has greater operability.

2. The invention adopts a curvature-based point cloud segmentation and feature detection method and a column model reconstruction to perform three-dimensional reconstruction of a building point cloud to obtain a building geometric model. It avoids the problem that it is difficult to determine the topological relationship between different contours after extracting building contours by traditional methods. It has high reconstruction accuracy and can well reflect the geometric structure characteristics of buildings.

3. The invention adopts the single-building geometric model of point cloud reconstruction to evaluate the solar energy utilization potential of the urban high-density area, avoids the insufficient consideration of the solar energy utilization potential of building facade by the existing technology, and is more comprehensive and accurate for the solar energy utilization potential evaluation.

BRIEF DESCRIPTION OF THE DRAWINGS

FIG. 1 shows the workflow of an evaluation method of solar energy utilization potential in urban high-density areas based on low-altitude photogrammetry according to the present invention.

DETAILED DESCRIPTION OF THE INVENTION

The technical solution in the embodiments of the present invention will be clearly and completely described below with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The invention utilizes low-altitude photogrammetry to obtain point cloud data in a high-density area of the city, and performs semantic division and three-dimensional reconstruction on the point cloud data through a parameterization tool to obtain a singular geometric model, so as to simulate and analyze the magnitude and dynamic changes of solar energy utilization potential obtained from the roof and facade of building in the same platform.

FIG. 1 illustrates the present invention proposes an evaluation method of solar energy utilization potential in urban high-density areas based on low-altitude photogrammetry, comprising the following steps:

Step 1, Obtain high-density regional low-altitude remote sensing image data, and generate 3D point cloud data through image processing; the low-altitude remote sensing image data are high-resolution image data obtained by the consumption-grade multi-rotor drone and the tilt photography method of the single camera.

The tilted photogrammetric image of the experimental area was acquired as experimental data by a single-camera tilt photogrammetry method using a consumer-grade multi-rotor drone. The tilt photogrammetric method of the single camera is to take pictures of the ground objects from the front, back, left, right and vertical directions by a single high-pixel platform camera mounted by the drone. The drone's altitude is 100 m, the longitudinal overlap rate is 85%, the side overlap rate is 85%, and the camera's tilt angle is 40 degrees. The Pix4Dmapper software was used to perform preliminary processing, spatial encryption, and dense matching on the acquired experimental area images to obtain 3D point cloud data in the experimental area. The output point cloud format is .las. The output base plane is World Geodetic System 1984, and the output coordinate system WGS 84.

Step 2, Based on the information carried by the three-dimensional point cloud data, the point cloud of building subject is distinguished from that of the non-building subject, and the filtered singular three-dimensional point cloud data are obtained;

In the parametric modeling tool, the color parameters in the point cloud model are extracted by Volvox plug-in, the points needed and the points non-needed are selected by setting RGB range.

In the parametric modeling tool grasshopper, the color parameters in the point cloud model are extracted by Volvox plug-in, the points needed and the points non-needed are selected by setting RGB range, specifically includes:

(1) the point cloud model P is decomposed into set $P_{XYZ}$ containing only coordinate information and set $P_{RGB}$ containing only color information;

(2) $P_{RGB}$ is decomposed into three independent collections $P_R$, $P_G$, $P_B$, which represent values of R, G, and B;

(3) Setting respective thresholds of $P_R$, $P_G$, and $P_B$ according to the color distribution of the three-dimensional point cloud data and the color of the object to be specifically selected;

(4) According to the intersection $P_{R \cap G \cap B}$ of $P_R$, $P_G$ and $P_B$, the required point set $P_s$ is filtered from the point cloud model P.

Through the above steps, the building point cloud can be quickly separated from the trees and the ground point cloud to obtain the singularized three-dimensional point cloud data.

Step 3, Through the point cloud patch segmentation method based on curvature and normal vector, and the subsequent column model reconstruction, the singular 3D point cloud data is reconstructed in three dimensions to obtain a singular urban high-density area building geometry model;

Neighborhood points are searched by KNN nearest neighbor algorithm, and the covariance matrix is constructed for neighborhood points. Normal vector and curvature are estimated by PCA principal component analysis algorithm to construct the seed region. Then the region growth algorithm is used to extract the point cloud patches on each side of the building. The mapping relationship between the roof patch and the ground plane grid is constructed, and the average height of the point cloud is taken as the grid height to obtain the columnar model of the building, and the plane fitting of the column model is carried out to obtain the singular geometric model of the building in the urban high-density area.

Seed region selection—for a point P, the covariance matrix Cov of all points in its neighborhood is:

$$\text{Cov}(P_i, P_i) = E[(P_i - E[P_i]) \cdot (P_i - E[P_i])^T]$$

$$E[P_i] = \overline{P}_i = \frac{1}{k}\sum_{i=1}^{k} P_i$$

In the formula, K denotes the number of points in the neighborhood of the point P; $P_i$ denotes the i-th point in the neighborhood; $\overline{P}_i$ denotes the center of gravity of all points in the neighborhood of the point. The method of PCA principal component analysis is used to obtain the eigenvalues $\lambda_0$, $\lambda_1$, $\lambda_2$ ($\lambda_0 \leq \lambda_1 \leq \lambda_2$) and the corresponding eigenvectors $V_0$, $V_1$, $V_2$, The eigenvector $V_0$ corresponding to the minimum eigenvalue $\lambda_0$ is taken as the normal vector of the point. Then the seed region is selected by calculating the curvature of the point; the curvature of the point is:

$$\sigma = \frac{\lambda 0}{\lambda 0 + \lambda 1 + \lambda 2}$$

When $\sigma$ is less than the curvature threshold $\sigma_T$, it can be considered that the neighborhood point of point P is on a plane, and the neighborhood point corresponding to curvature $\sigma$ is selected as the required seed region.

Region Growth and Point Cloud Patch Segmentation— The initial plane parameters can be obtained when the required seed regions are found. When the distance from point $P_i$ to the initial plane is less than the distance threshold, point $P_i$ is considered to be the plane where the initial plane is located. When the distance to the initial plane is less than the distance threshold, the region grows completely. The number of points meeting the required points is counted, and the standard deviation of the patches obtained by the growth is calculated. When the standard deviation is less than the set threshold, the patch extraction is considered complete and meets the extraction requirements. According to the intersection of the building façade and the ground plane G, the two-dimensional contour range B of the building on the ground is obtained.

Three-dimensional reconstruction: Arbitrarily select a point on the ground plane G as the origin. The X-Y plane is established with the ground plane, and the Z direction is perpendicular to the ground plane and pointing to the direction of the building point cloud, so as to establish the space rectangular coordinate system. And calculate the coordinates of the point cloud in the roof patch $P_0$ in the new coordinate system. In the area of two-dimensional contour range B, the same size grid $G=\{g(i, j)|1 \leq j \leq n\}$ is spread over the area, where m and n are the number of grid rows and columns in the area. Points in $P_0$ are projected to the X-Y plane, which can form a mapping relationship between $P_0$ and grids: $f: p \rightarrow g(i,j), \forall p \in P_0$. For all p satisfying f (p)=g (i, j), the average height of point cloud (Z coordinate) is taken as the grid height. If no point cloud has projected in a grid, the grid height is 0. For the grid with the height of 0, the height of the adjacent grid within B is interpolated to update its height, and the column model of the building is obtained. A planar fit is applied to the cylindrical model to obtain a flat geometric model.

Step 4, through the computer simulation of the singular geometric model of buildings in the urban high-density area, the distribution information of solar radiation on the surface of buildings is obtained. Data analysis is performed on the distribution information of the solar radiation on the surface of the building, and the potential of solar energy utilization in the urban high-density area is evaluated through the results of data analysis. Through computer simulation based on the HoneyBee toolkit of Grasshopper platform, the distribution information of solar radiation on the surface of buildings, such as distribution intensity, distribution interface, distribution period and total amount, etc. are obtained in urban high-density areas. According to the results, guidance and optimization suggestions are provided for the comprehensive utilization of solar energy in urban high-density areas.

The method for evaluating solar energy utilization potential in urban high-density Areas based on low-altitude photogrammetry provided in the present invention is described in detail above. Specific examples are used herein to describe the principle and implementation modes of the present invention. The description of the above embodiments is merely used to help understand the method and core idea of the present invention. Meanwhile, those skilled in the art may make changes to the specific implementation manners and the application scope according to the idea of the present invention. As described above, this description is not to be construed as limiting the invention.

What is claimed is:

1. An evaluation method of solar energy utilization potential in urban high-density areas based on low-altitude photogrammetry, comprising the following steps:
   step 1, obtaining low-altitude remote sensing image data of urban high-density area, and generating three-dimensional point cloud data through image processing;
   step 2, based on information carried by the three-dimensional point cloud data, distinguishing point cloud of building subject from that of non-building subject, and obtaining filtered singular three-dimensional point cloud data;
   step 3, through point cloud patch segmentation method based on curvature and normal vector, and the subsequent column model reconstruction, reconstructing singular 3D point cloud data in three dimensions to obtain a singular urban high-density area building geometry model;
   step 4, through computer simulation of singular geometric model of buildings in the urban high-density area, obtaining distribution information of solar radiation on a surface of a building; performing data analysis on distribution information of solar radiation on the surface of the building, and evaluating the potential of solar energy utilization in the urban high-density area through results of data analysis;
   wherein the low-altitude remote sensing image data are high-resolution image data obtained by consumption-grade multi-rotor drone and tilt photography method of a single camera;
   wherein the step 2 comprises: in a parametric modeling tool, extracting color parameters in the point cloud model by Volvox plug-in, and selecting desired points and the points to be filtered by setting the RGB range.

2. The method of claim 1, further comprising:
(1) decomposing the point cloud model P into set $P_{XYZ}$ containing only coordinate information and set $P_{RGB}$ containing only color information;
(2) decomposing $P_{RGB}$ into three independent collections $P_R$, $P_G$, $P_B$, which represent values of R, G, and B;
(3) setting respective thresholds of $P_R$, $P_G$, and $P_B$ according to color distribution of the three-dimensional point cloud data and the color of object to be specifically selected;
(4) according to intersection $P_{R \cap G \cap B}$ of $P_R$, $P_G$ and $P_B$, filtering out needed set $P_s$ from point cloud model P.

3. The method of claim 2, wherein the step 3 comprises: searching neighborhood points by KNN nearest neighbor algorithm, and constructing covariance matrix for neighborhood points; estimating normal vector and curvature by PCA principal component analysis algorithm to construct a seed region; then using a region growth algorithm to extract point cloud patches on each side of the building; constructing a mapping relationship between roof patch $P_0$ and ground plane grid, and taking an average height of the point cloud as a grid height to obtain a columnar model of the building, and carrying out a plane fitting of a column model to obtain the singular geometric model of the building in the urban high-density area.

* * * * *